(12) United States Patent
Hirosawa et al.

(10) Patent No.: US 10,763,717 B2
(45) Date of Patent: Sep. 1, 2020

(54) STATOR CORE, STATOR, ELECTRIC MOTOR, DRIVE DEVICE, COMPRESSOR, AIR CONDITIONER, AND A METHOD OF MANUFACTURING A STATOR CORE

(71) Applicant: Mitsubishi Electric Corporation, Tokyo (JP)

(72) Inventors: Yuji Hirosawa, Tokyo (JP); Masahiro Nigo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/321,595

(22) PCT Filed: Sep. 13, 2016

(86) PCT No.: PCT/JP2016/076964
§ 371 (c)(1),
(2) Date: Jan. 29, 2019

(87) PCT Pub. No.: WO2018/051407
PCT Pub. Date: Mar. 22, 2018

(65) Prior Publication Data
US 2019/0386534 A1 Dec. 19, 2019

(51) Int. Cl.
*H02K 1/14* (2006.01)
*H02K 11/00* (2016.01)
(Continued)

(52) U.S. Cl.
CPC ............. *H02K 3/42* (2013.01); *F25B 31/026* (2013.01); *H02K 1/146* (2013.01); *H02K 1/276* (2013.01);
(Continued)

(58) Field of Classification Search
CPC ........ H02K 3/42; H02K 21/16; H02K 15/022; H02K 3/325; H02K 1/276; H02K 1/146;
(Continued)

(56) References Cited

U.S. PATENT DOCUMENTS

2010/0259126 A1* 10/2010 Yoshikawa .......... H02K 1/2706
310/216.064
2017/0330681 A1* 11/2017 Kitagawa .............. H01F 27/245

FOREIGN PATENT DOCUMENTS

JP H04-271240 A 9/1992
JP 2005-151648 A 6/2005
(Continued)

OTHER PUBLICATIONS

International Search Report of the International Searching Authority dated Nov. 22, 2016 for the corresponding International application No. PCT/JP2016/076964 (and English translation).
(Continued)

*Primary Examiner* — Thomas Truong
(74) *Attorney, Agent, or Firm* — Posz Law Group, PLC

(57) ABSTRACT

A stator core includes a first core portion including a plurality of first plates stacked in a first direction; a second core portion including a plurality of second plates stacked in the first direction; and a third core portion including a plurality of third plates stacked in at least one direction orthogonal to the first direction, the third core portion being sandwiched between the first core portion and the second core portion. The third core portion has a yoke portion formed of a subset of the plurality of third plates stacked in a second direction orthogonal to the first direction.

21 Claims, 12 Drawing Sheets

(51) Int. Cl.
  *H02K 3/32* (2006.01)
  *H02K 15/02* (2006.01)
  *H02K 3/42* (2006.01)
  *H02K 11/33* (2016.01)
  *F25B 31/02* (2006.01)
  *H02K 1/27* (2006.01)
  *H02K 21/16* (2006.01)

(52) U.S. Cl.
  CPC ............ *H02K 3/325* (2013.01); *H02K 11/33* (2016.01); *H02K 15/022* (2013.01); *H02K 21/16* (2013.01)

(58) Field of Classification Search
  CPC ...... H02K 11/33; H02K 1/18; H02K 2213/03; H02K 3/522; H02K 7/14; H02K 1/14–1/148; F25B 31/026; F25B 1/00
  USPC .................................... 310/216.001–216.137
  See application file for complete search history.

(56) References Cited

FOREIGN PATENT DOCUMENTS

| | | |
|---|---|---|
| JP | 2006-296010 A | 10/2006 |
| JP | 2010-017002 A | 1/2010 |
| JP | 2012-253918 A | 12/2012 |
| JP | 2014-117090 A | 6/2014 |
| JP | 2014-155347 A | 8/2014 |

OTHER PUBLICATIONS

Office Action dated Dec. 17, 2019 issued in corresponding JP patent application No. 2018-538986 (and English translation).

Office Action dated Apr. 7, 2020 issued in corresponding CN patent application No. 201680088805.3(and English translation).

\* cited by examiner

US 10,763,717 B2

STATOR CORE, STATOR, ELECTRIC MOTOR, DRIVE DEVICE, COMPRESSOR, AIR CONDITIONER, AND A METHOD OF MANUFACTURING A STATOR CORE

CROSS REFERENCE TO RELATED APPLICATION

This application is a U.S. national stage application of International Patent Application No. PCT/JP2016/076964 filed on Sep. 13, 2016, the disclosure of which is incorporated herein by reference.

TECHNICAL FIELD

The present invention relates to a stator core used in an electric motor.

BACKGROUND ART

Electric motors including a rotor and a stator are commonly used. To prevent increase in iron loss, in particular increase in eddy current loss, a stator core in which multiple thin electromagnetic steel sheets are stacked is commonly used as a component of a stator. For example, there has been proposed a stator core including multiple electromagnetic steel sheets stacked in a direction (e.g., a radial direction) orthogonal to a rotation axis direction of the electric motor (see, e.g., Patent Literature 1).

PATENT LITERATURE

Patent Literature 1: Japanese Patent Application Publication No. 2010-17002

However, a stator core including multiple electromagnetic steel sheets stacked in a direction (e.g., a radial direction) orthogonal to a rotation axis direction of the electric motor has low stiffness with respect to the direction orthogonal to the rotation axis direction of the electric motor, which can cause vibration (e.g., vibration in the direction orthogonal to the rotation axis direction) and noise during driving of the electric motor.

SUMMARY

An object of the present invention is to provide a stator core that reduces vibration and noise during driving of the electric motor.

A stator core of the present invention includes: a first core portion including a plurality of first plates stacked in a first direction; a second core portion including a plurality of second plates stacked in the first direction; and a third core portion including a plurality of third plates stacked in a direction orthogonal to the first direction, the third core portion being sandwiched between the first core portion and the second core portion.

According to the present invention, it is possible to provide a stator core that reduces vibration and noise during driving of the electric motor.

DETAILED DESCRIPTION

First Embodiment

Figure 1:
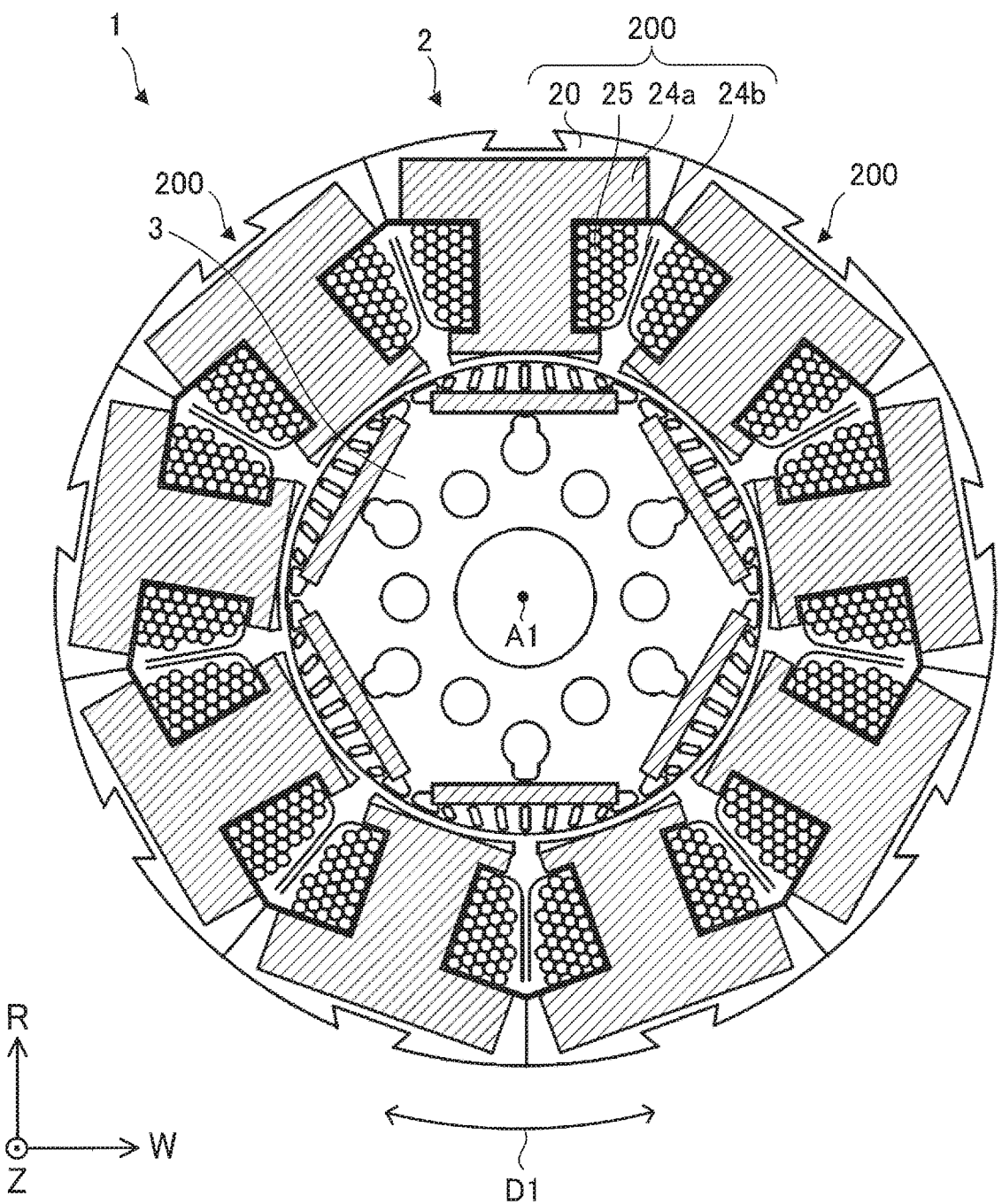
FIG. 1 is a sectional view schematically illustrating a configuration of an electric motor according to a first embodiment of the present invention.

FIG. 1 is a sectional view schematically illustrating a configuration of an electric motor 1 according to a first embodiment of the present invention. Arrow D1 indicates a direction (referred to below as the "circumferential direction") along an outer periphery of each of a stator 2, a stator core 20, and a rotor 3. In the ZRW orthogonal coordinate system illustrated in each drawing, the Z axis direction (Z axis) indicates a direction (referred to below as the "rotation axis direction") parallel to an axis line (shaft center) A1 of a shaft (shaft 33 to be described later) of the electric motor 1, the R axis direction (R axis) indicates a direction orthogonal to the Z axis direction, and the W axis direction (W axis) indicates a direction orthogonal to both the Z axis direction and the R axis direction.

The electric motor 1 includes the stator 2 and rotor 3. The electric motor 1 is, for example, an permanent magnet embedded electric motor.

The stator 2 includes the stator core 20, a first insulator 24a, a second insulator 24b, and a winding 25. The stator 2 is formed in an annular shape in the circumferential direction about the axis line A1 (a rotation axis of the rotor 3). The rotor 3 is inserted in the stator 2 with an air gap therebetween. The first insulator 24a and second insulator 24b insulate the stator core 20.

The stator core 20 includes a first core portion 21, a second core portion 22, and a third core portion 23 (see FIGS. 2 and 3 to be described later). In this embodiment, the stator 2 is formed of multiple separate core segments 200. The multiple separate core segments 200 are arranged in an annular shape in the circumferential direction about the axis line A1. However, the stator 2 need not be formed of the multiple separate core segments 200. For example, the stator core 20 may be formed by stacking multiple various annular plates (such as electromagnetic steel sheets and amorphous material plates).

A configuration of a separate core segment 200 will be described below.

Figure 2:
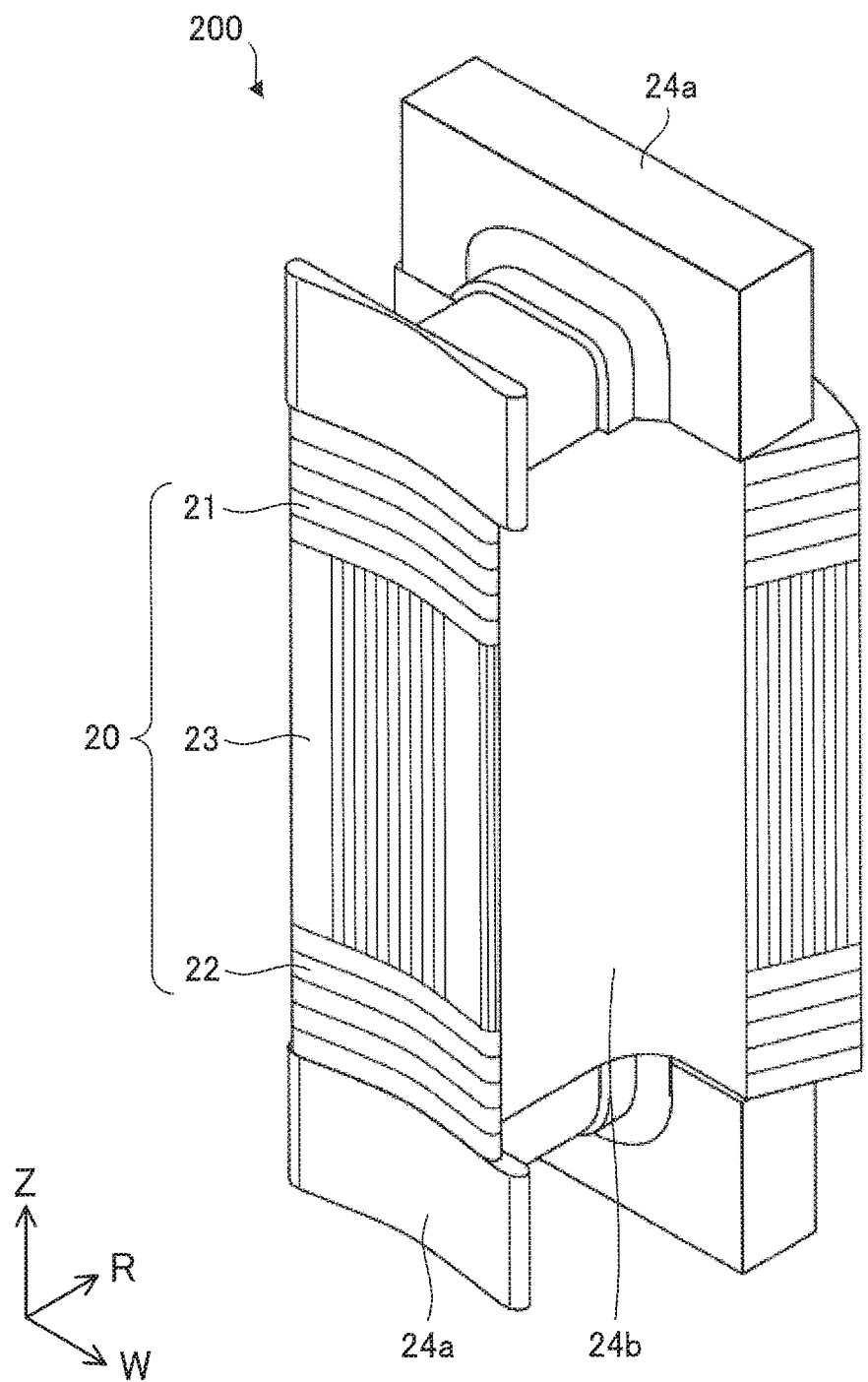
FIG. 2 is a perspective view schematically illustrating a configuration of a separate core segment.

FIG. 2 is a perspective view schematically illustrating a configuration of a separate core segment 200.

In this embodiment, since the stator 2 is formed of the multiple separate core segments 200, each separate core segment 200 includes a first core portion 21 (separate first core portion 21), a second core portion 22 (separate second core portion 22), a third core portion 23 (separate third core portion 23), a first insulator 24a, a second insulator 24b, and a winding 25. However, in an example illustrated in FIG. 2, the winding 25 is not illustrated.

The first insulator 24a is combined with the stator core 20. In this embodiment, the first insulator 24a is provided at both ends of the stator core 20 in the rotation axis direction. However, the first insulator 24a may be provided at one end of the stator core 20 in the rotation axis direction. In this embodiment, the first insulator 24a is made of insulating resin.

The second insulator 24b is, for example, thin polyethylene terephthalate (PET) films. The PET films have a thickness of, for example, 0.15 mm. The second insulator 24b covers side surfaces of a tooth portion (tooth portions 222 and 232 to be described later) of the stator core 20.

Figure 3:
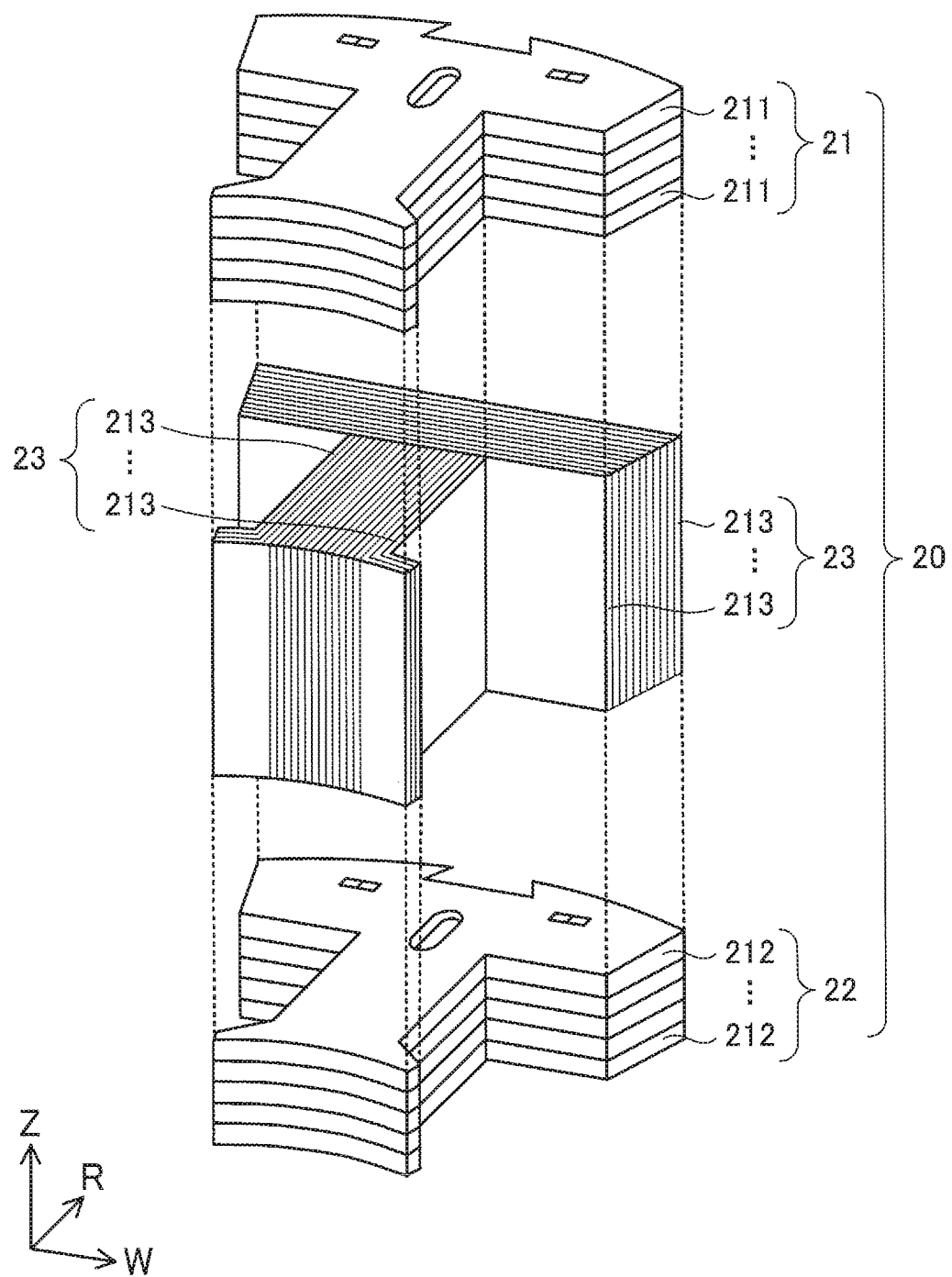
FIG. 3 is an exploded view schematically illustrating a configuration of a stator core.

FIG. 3 is an exploded view schematically illustrating a configuration of the stator core 20 (separate stator core 20).

The first core portion 21 includes multiple first plates 211 stacked in a first direction. In other words, the multiple first plates 211 are stacked parallel to a plane perpendicular to the first direction. In this embodiment, the first direction is the Z axis direction. The first plates 211 are, for example, electromagnetic steel sheets. The first plates 211 are formed in a predetermined shape by punching (press punching). The first plates 211 have thicknesses of, for example, 0.1 mm to 0.7 mm. In this embodiment, the first plates 211 have thicknesses of 0.35 mm. However, the shapes and thicknesses of the first plates 211 are not limited to those in this embodiment. Each first plate 211 is connected to adjacent first plate or plates 211 by swaged portions 223 to be described later.

The second core portion 22 includes multiple second plates 212 stacked in the first direction. In other words, the multiple second plates 212 are stacked parallel to a plane perpendicular to the first direction. The second plates 212 are, for example, electromagnetic steel sheets. The second plates 212 are formed in a predetermined shape by punching. The second plates 212 have thicknesses of, for example, 0.1 mm to 0.7 mm. In this embodiment, the second plates 212 have thicknesses of 0.35 mm. However, the shapes and thicknesses of the second plates 212 are not limited to those in this embodiment. Each second plate 212 is connected to adjacent second plate or plates 212 by swaged portions 223 to be described later.

In this embodiment, the first core portion 21 and second core portion 22 are formed of the same material, and have the same configuration. That is, the first plates 211 and the second plates 212 are formed of the same material, and have the same configuration. However, the first core portion 21 and second core portion 22 may be formed of different materials, and may have different configurations. That is, the first plates 211 and the second plates 212 may be formed of different materials, and may have different configurations. It is desirable that at least one of the multiple first plates 211 and the multiple second plates 212 be multiple electromagnetic steel sheets.

The third core portion 23 includes multiple third plates 213 stacked in a direction orthogonal to the first direction (Z axis direction). The direction orthogonal to the first direction is, for example, the R axis direction (a second direction) or the W axis direction (a third direction). In other words, the multiple third plates 213 are stacked perpendicular to a plane perpendicular to the first direction.

The third core portion 23 is sandwiched between the first core portion 21 and the second core portion 22. In other words, the third core portion 23 is fixed between the first core portion 21 and the second core portion 22. In this embodiment, the first core portion 21 is fixed to one end of the third core portion 23 in the first direction, and the second core portion 22 is fixed to the other end of the third core portion 23 in the first direction.

The third plates 213 are, for example, thin plates formed of amorphous material (e.g., amorphous metal) or nanocrystalline material (e.g., nanocrystalline metal). The third plates 213 are, for example, rectangular.

At least one of the first core portion 21 and second core portion 22 may be larger than the third core portion 23 in a radial direction (the R axis direction in the example illustrated in FIG. 3) of the stator core 20.

Each of the multiple third plates 213 is thinner than each of the multiple first plates 211. Each of the multiple third plates 213 is thinner than each of the multiple second plates 212. The third plates 213 have thicknesses of, for example, 5 μm to 50 μm. In this embodiment, the third plates 213 have thicknesses of 20 μm. However, the shapes and thicknesses of the third plates 213 are not limited to those in this embodiment. Each third plate 213 can be fixed to adjacent third plate or plates 213 by formation with a die, adhesive, or welding.

Figure 4:
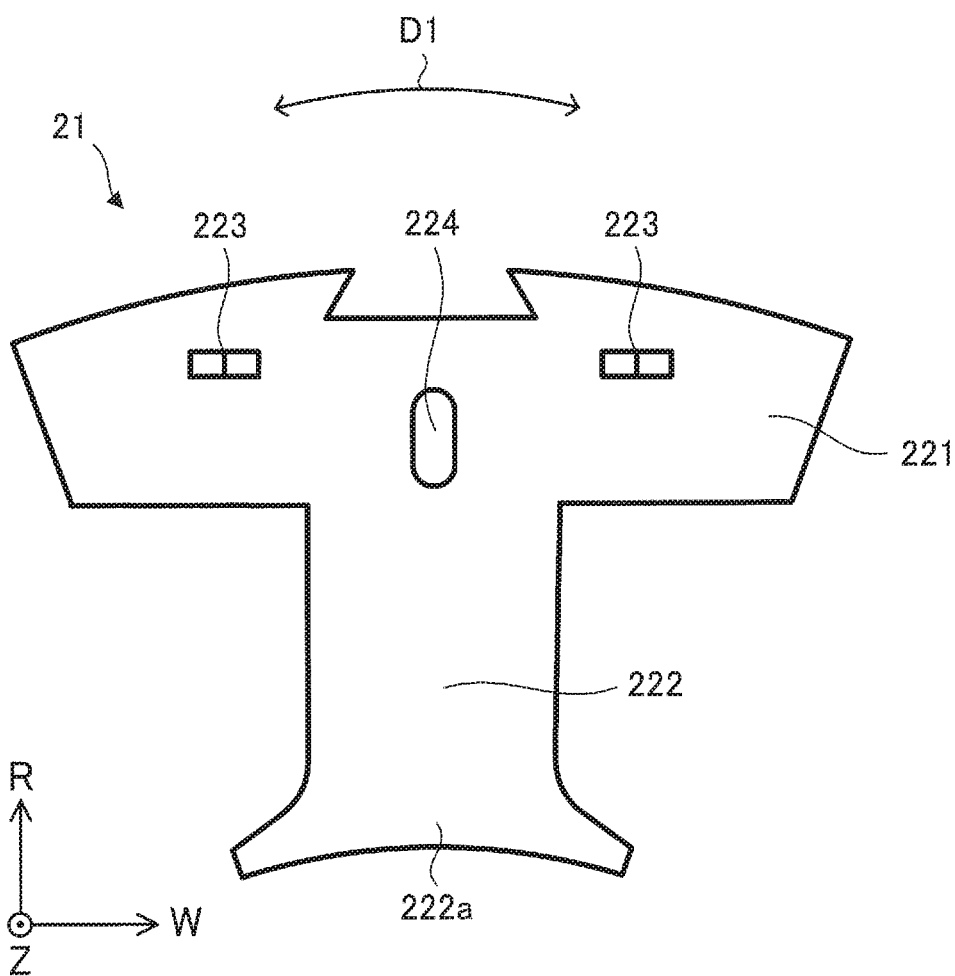
FIG. 4 is a plan view schematically illustrating an example of a first core portion and a second core portion.

FIG. 4 is a plan view schematically illustrating an example of the first core portion 21 and second core portion 22. In this embodiment, the first core portion 21 and second core portion 22 have the same configuration, and FIG. 4 illustrates a configuration of the first core portion 21.

The first core portion 21 includes a yoke portion 221, the tooth portion 222, the swaged portions 223, and an insulator fixation portion 224.

The tooth portion 222 extends from the yoke portion 221 in the radial direction (the −R direction, i.e., inward in the radial direction of the stator core 20, in the example illustrated in FIG. 4). In other words, the tooth portion 222 projects from the yoke portion 221 toward the axis line A1. The tooth portion 222 has a tip portion 222a that is a tip in the radial direction. The tip portion 222a is formed to extend in the circumferential direction of the stator core 20.

The insulator fixation portion 224 fixes the first insulator 24a. In this embodiment, the insulator fixation portion 224 is a recess in which an insulator positioning portion 241 (see FIG. 9 to be described later) of the first insulator 24a is inserted.

Figure 5:
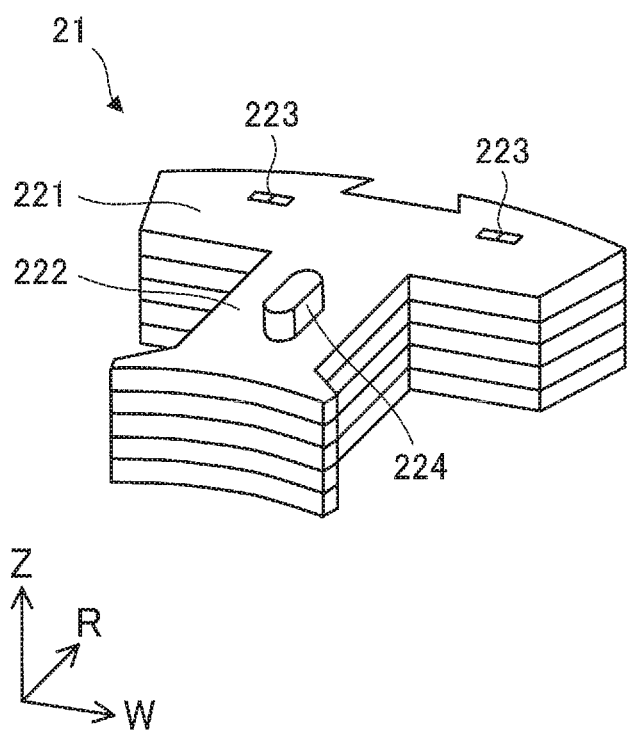
FIG. 5 is a perspective view schematically illustrating another example of the first core portion.

FIG. 5 is a perspective view schematically illustrating another example of the first core portion 21.

Figure 6:
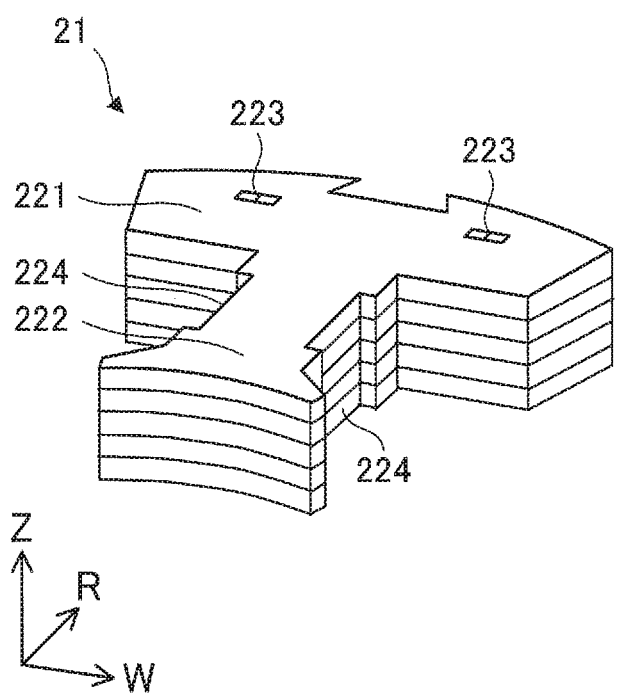
FIG. 6 is a perspective view schematically illustrating still another example of the first core portion.

FIG. 6 is a perspective view schematically illustrating still another example of the first core portion 21.

The configurations of the first core portion 21 illustrated in FIGS. 5 and 6 are applicable to the second core portion 22.

As illustrated in FIG. 5, the insulator fixation portion 224 may be formed in the tooth portion 222. Further, the insulator fixation portion 224 may be a projection. In this case, the insulator positioning portion 241 of the first insulator 24a is formed in a recessed shape.

As illustrated in FIG. 6, the insulator fixation portion 224 may be formed in the side surfaces of the tooth portion 222. In this case, the insulator positioning portion 241 of the first insulator 24a is formed in a shape and at a position such that it can fit the insulator fixation portion 224.

Figure 7:
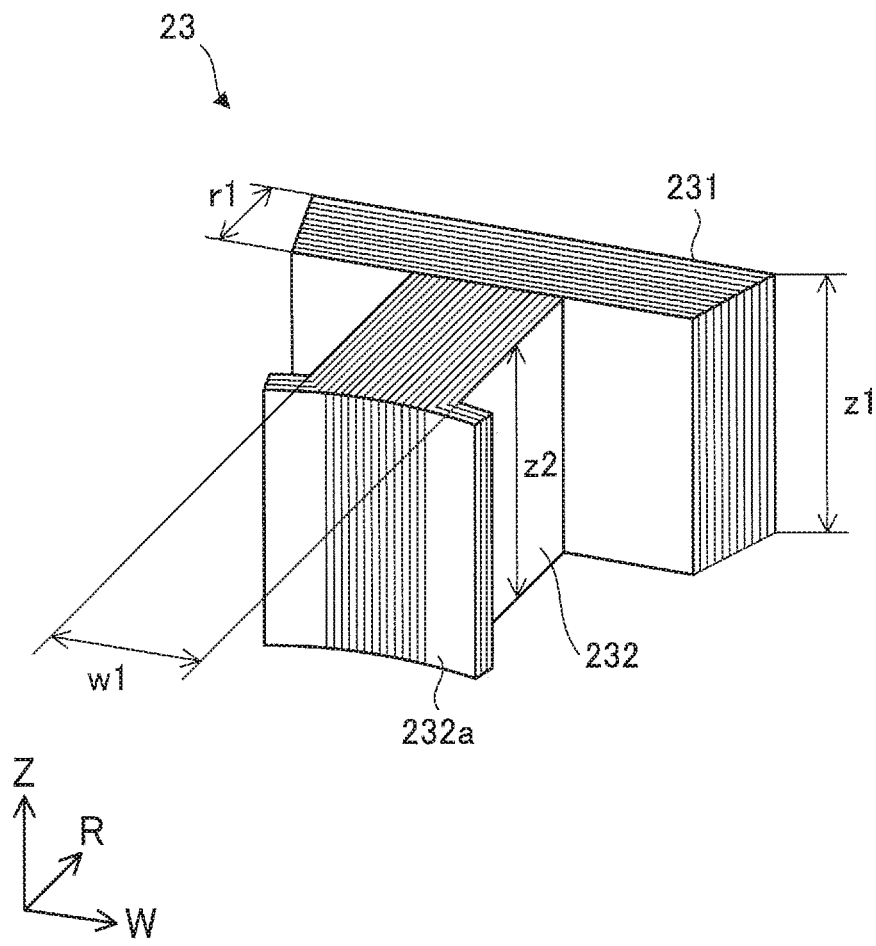
FIG. 7 is a perspective view schematically illustrating a configuration of a third core portion.

FIG. 7 is a perspective view schematically illustrating a configuration of the third core portion 23.

The third core portion 23 includes a yoke portion 231 formed of a subset of the multiple third plates 213 (FIG. 3) stacked in the second direction orthogonal to the first direction. A length z1 of the yoke portion 231 in the first direction is greater than a width r1 of the yoke portion 231 in the second direction. In this embodiment, the second direction is the radial direction (e.g., the R axis direction in FIGS. 2, 3, and 7). However, the second direction is not limited to the radial direction. For example, from the viewpoint of cost, it is desirable to select the second direction so that the number of the third plates 213 is reduced.

The third core portion 23 includes the tooth portion 232 formed of a subset of the multiple third plates 213 stacked in the third direction orthogonal to the first direction. A length z2 of the tooth portion 232 in the first direction is greater than a width w1 of the tooth portion 232 in the third direction. In this embodiment, the length z2 is equal to the length z1. In this embodiment, the third direction is orthogonal to both the first direction and second direction. For example, in FIGS. 2, 3, and 7, the third direction is the W axis direction. However, the third direction is not limited to the W axis direction. For example, from the viewpoint of cost, it is desirable to select the third direction so that the number of the third plates 213 is reduced.

The tooth portion 232 extends from the yoke portion 231 in the radial direction (i.e., inward in the radial direction of the stator core 20). In other words, the tooth portion 232 projects from the yoke portion 231 toward the axis line A1. The tooth portion 232 has a tip portion 232a that is a tip in the radial direction. The tip portion 232a is formed to extend in the circumferential direction of the stator core 20.

Figure 8:
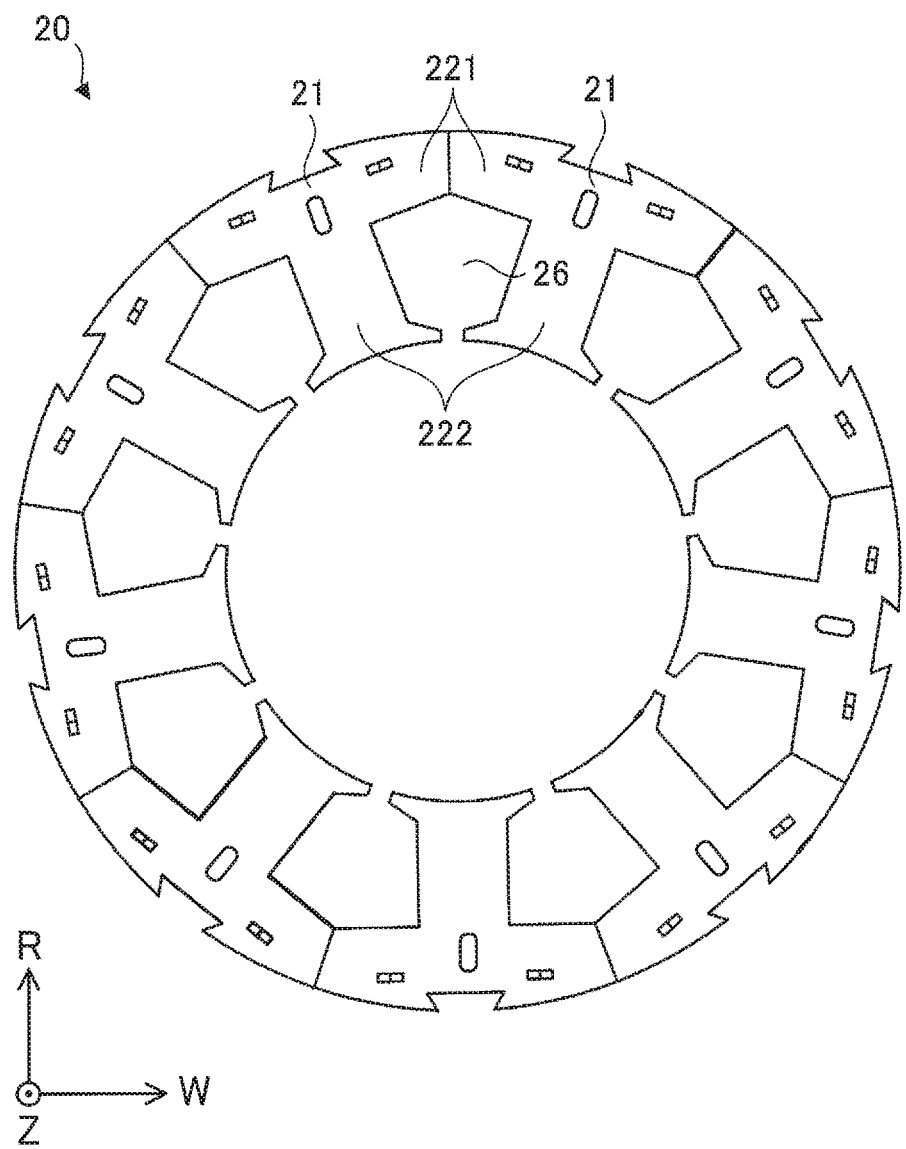
FIG. 8 is a plan view schematically illustrating a configuration of a stator core.

FIG. 8 is a plan view schematically illustrating a configuration of the stator core 20.

The yoke portions 221 of each adjacent two of the stator cores 20 are connected together, so that each adjacent two of the yoke portions 221 are connected together. That is, the stator cores 20 (separate stator cores 20) of each adjacent two of the separate core segments 200 are connected together, so that the separate core segments 200 illustrated in FIG. 1 are connected together. Each adjacent two of the first core portions 21 may be connected together, and each adjacent two of the second core portions 22 may be connected together. A region surrounded by two yoke portions 221 and two tooth portions 222 is a slot portion 26.

The tooth portions 222 of the stator core 20 are adjacent through slot portions 26. Thus, the multiple tooth portions 222 and multiple slot portions 26 are alternately arranged in the circumferential direction. The pitches at which the multiple tooth portions 222 are arranged in the circumferential direction (i.e., widths of the slot portions 26 in the circumferential direction) are equal.

The multiple slot portions 26 are formed at equal intervals in the circumferential direction. In this embodiment, the number of the slot portions 26 formed in the stator 2 is nine.

To increase the torque of the electric motor 1, it is desirable that the stator core 20 be formed so that the space factor of the windings 25 (the ratio of a sectional area of the windings 25 to a sectional area of the slot portions 26) is high.

Figure 9:
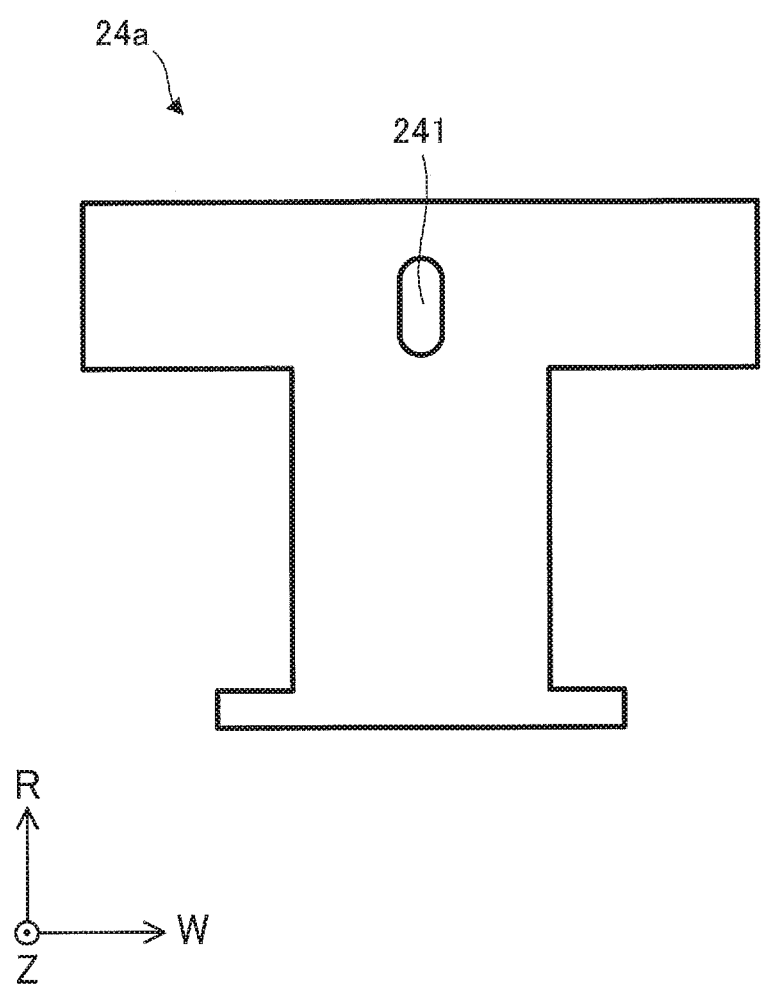
FIG. 9 is a plan view schematically illustrating a configuration of a first insulator.

FIG. 9 is a plan view schematically illustrating a configuration of the first insulator 24a.

The first insulator 24a has the insulator positioning portion 241 that is engaged with the insulator fixation portion 224 of the stator core 20. In this embodiment, the insulator positioning portion 241 is a projection that is inserted in the insulator fixation portion 224.

Figure 10:
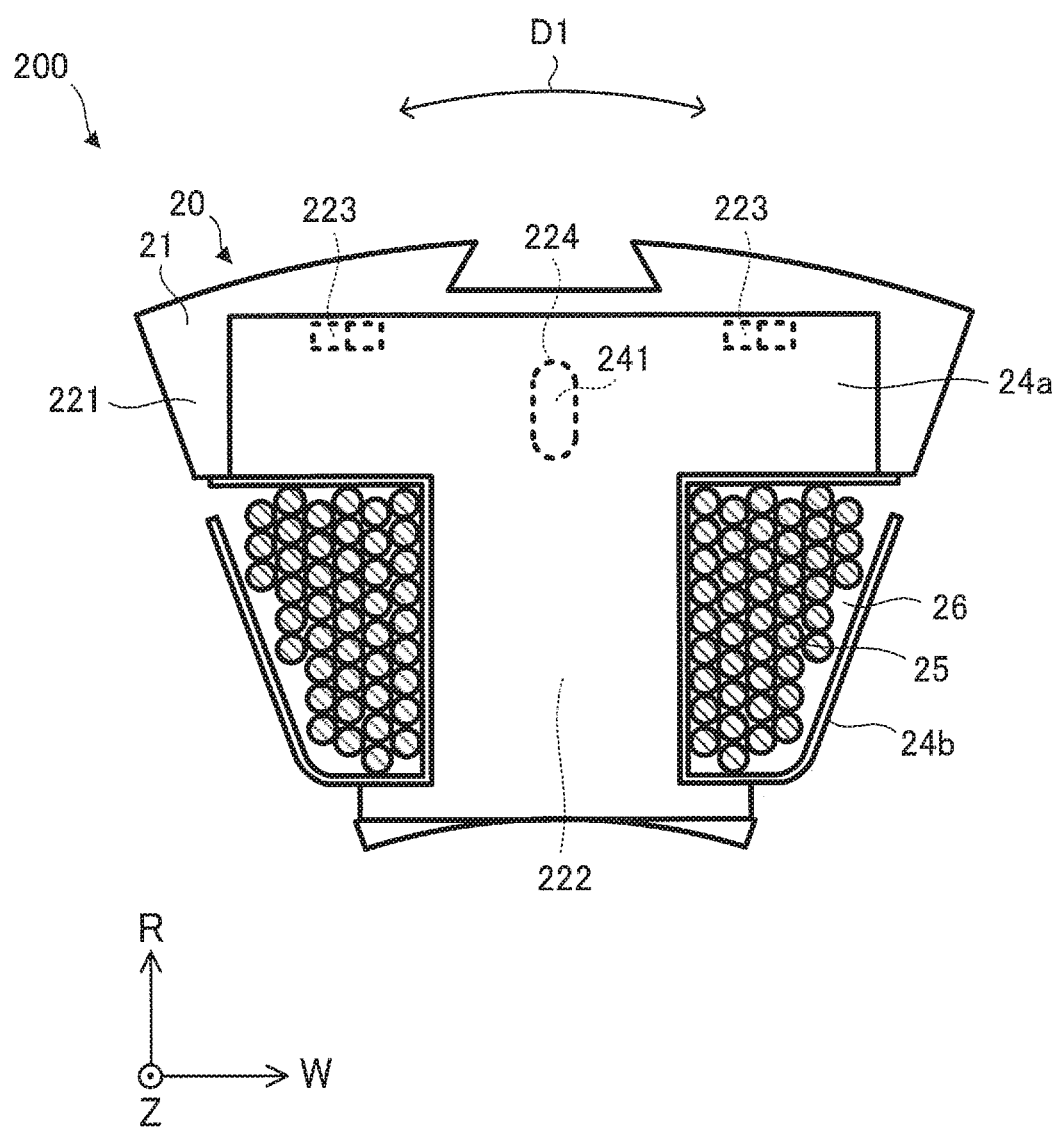
FIG. 10 is a sectional view schematically illustrating a configuration of the separate core segment.

FIG. 10 is a sectional view schematically illustrating a configuration of the separate core segment 200.

The winding 25 is wound around the stator core 20 via the first insulator 24a and second insulator 24b, and forms a coil for generating a rotating magnetic field.

The winding 25 is, for example, magnet wire. In this embodiment, the stator 2 is a three-phase stator, and the connection of the windings (coils) 25 is a Y-connection (star connection). The number of turns and the wire diameter of the winding (coil) 25 are determined depending on the number of revolutions, torque, and voltage specifications of the electric motor 1, the sectional areas of the slot portions 26, and the like. In this embodiment, the wire diameter of the winding 25 is 1.0 mm. In this embodiment, the winding 25 is wound 80 turns around the stator core 20. However, the wire diameter and number of turns of the winding 25 are not limited to these examples.

In this embodiment, the winding (coil) 25 is a concentrated winding. For example, the windings 25 can be wound around the stator cores 20 in a state before the separate stator cores 20 are arranged in an annular shape (for example, in a state where the separate stator cores 20 are arranged in a straight line). The stator cores 20 wound with the windings 25 are folded into an annular shape and fixed by welding or the like.

A configuration of the rotor 3 will be described below.

Figure 11:
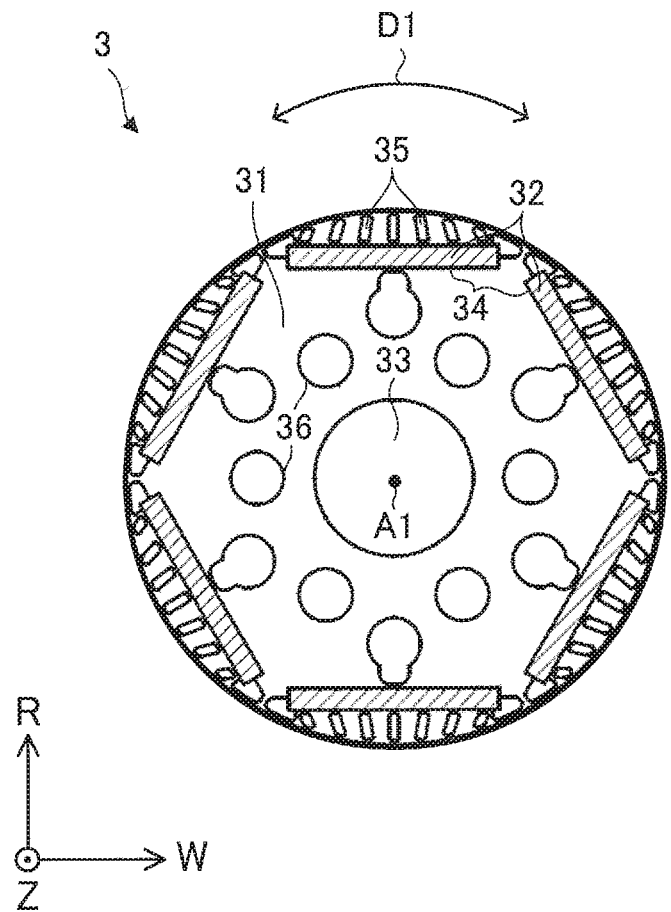
FIG. 11 is a sectional view schematically illustrating a configuration of a rotor.

FIG. 11 is a sectional view schematically illustrating a configuration of the rotor 3.

The rotor 3 includes a rotor core 31, multiple permanent magnets 32, the shaft 33, multiple magnet insertion holes 34, multiple flux barriers (flux leakage reduction holes) 35, and multiple air holes 36.

The rotor 3 is rotatable about the axis line A1. The rotor 3 is rotatably disposed inside the stator 2 with the air gap therebetween. The axis line A1 is a rotation center of the rotor 3, and is an axis line of the shaft 33. The air gap formed between the rotor 3 and the stator 2 (specifically, between an outer surface of the rotor 3 and an inner surface of the stator 2) is, for example, 0.3 mm to 1 mm. Supplying current to the windings 25 generates a rotating magnetic field, rotating the rotor 3. The current supplied to the windings 25 is a current having a frequency in synchronization with a commanded number of revolutions (number of revolutions of the rotor 3).

In this embodiment, the rotor 3 is a permanent magnet embedded rotor. In the rotor core 31, the multiple magnet insertion holes 34 are formed in the circumferential direction of the rotor 3. The magnet insertion holes 34 are spaces in which the permanent magnets 32 are inserted. In each magnet insertion hole 34, multiple permanent magnets 32 are disposed. However, it is also possible to dispose one permanent magnet 32 in each magnet insertion hole 34. The multiple permanent magnets 32 are magnetized in the radial direction of the rotor 3, and have the same magnetic pole positional relationship. The number of the magnet insertion holes 34 corresponds to the number of magnetic poles of the rotor 3. In this embodiment, the number of magnetic poles of the rotor 3 is six. However, it is sufficient that the number of magnetic poles of the rotor 3 be two or more.

The rotor core 31 is formed by stacking multiple electromagnetic steel sheets. Each electromagnetic steel sheet of the rotor core 31 has a thickness of 0.1 mm to 0.7 mm. In this embodiment, each electromagnetic steel sheet of the rotor core 31 has a thickness of 0.35 mm. However, the shape and thickness of each electromagnetic steel sheet of the rotor core 31 are not limited to those in this embodiment. Each electromagnetic steel sheet of the rotor core 31 is connected to adjacent electromagnetic steel sheet or sheets by swaging.

The shaft 33 is connected to the rotor core 31. Specifically, it is fixed in a shaft hole formed in the rotor core 31 by shrink fitting, press fitting, or the like. Thereby, rotational energy generated by rotation of the rotor core 31 is transmitted to the shaft 33.

The flux barriers 35 are formed adjacent to the magnet insertion holes 34 in the circumferential direction of the rotor 3. The flux barriers 35 reduce flux leakage. To prevent short circuit of magnetic flux between adjacent permanent magnets 32, it is desirable that the distances between the flux barriers 35 and the outer surface (outer periphery) of the rotor 3 be small. The distances between the flux barriers 35 and the outer surface of the rotor 3 are, for example, 0.35 mm. The air holes 36 are through holes. For example, when the electric motor 1 is used in a compressor, refrigerant can pass through the air holes 36.

The permanent magnets 32 may be, for example, rare earth magnets consisting primarily of neodymium (Nd), iron (Fe), and boron (B). The coercivity of Nd—Fe—B permanent magnets has the property of decreasing depending on temperature. For example, when an electric motor using Nd rare-earth magnets is used in a high temperature atmosphere not less than 100° C. like in a compressor, since the coercivity of the magnets decreases with temperature (about −0.5%/ΔK to −0.6%/ΔK), it is necessary to add dysprosium (Dy) to enhance the coercivity. The coercivity increases substantially in proportion to the content of Dy. In a typical compressor, the upper limit of the ambient temperature of the electric motor is about 150° C., and it is used below about 150° C. For example, when the temperature coefficient is −0.5%/ΔK, the coercivity decreases by 65%.

To prevent the demagnetization at the maximum load of the compressor, the coercivity needs to be 1100 A/m to 1500 A/m. To ensure the coercivity in an atmosphere at a temperature of 150° C., the room-temperature coercivity needs to be set to about 1800 A/m to 2300 A/m.

A Nd—Fe—B permanent magnet with no Dy added has a room-temperature coercivity of about 1800 A/m. To obtain a coercivity of about 2300 A/m, about 2 wt % of Dy needs to be added. However, addition of Dy improves the coercivity characteristic, but deteriorates the residual magnetic flux density characteristic. As the residual magnetic flux density decreases, the magnet torque of the electric motor decreases and the energization current increases, thus increasing copper loss. Thus, in view of motor efficiency, it is desirable to reduce the additive amount of Dy.

A method of manufacturing a stator core 20 will be described below.

Figure 12:
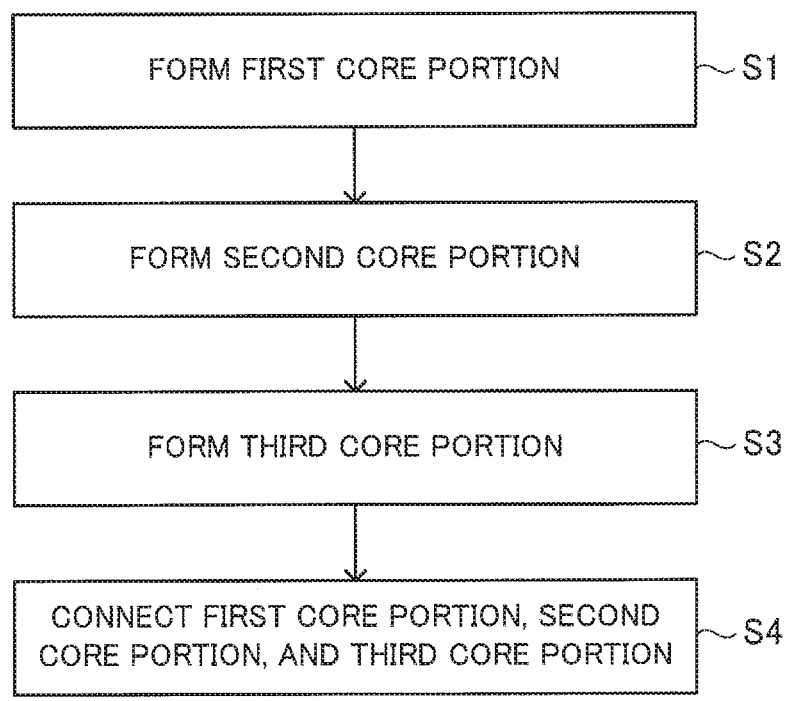
FIG. 12 is a flowchart illustrating an example of a manufacturing process of a stator core.

FIG. 12 is a flowchart illustrating an example of a manufacturing process of a stator core 20.

In step S1, a first core portion 21 is formed by forming multiple first plates 211 having a predetermined structure and stacking the multiple first plates 211 in the first direction (Z axis direction). The first plates 211 are, for example, electromagnetic steel sheets. For example, the first plates 211 are formed by punching (press punching) to have the predetermined structure. The multiple first plates 211 are stacked in the first direction while connected together by swaged portions 223, for example. The multiple first plates 211 may be stacked in the first direction while fixed together by bolting or riveting.

In step S2, a second core portion 22 is formed by forming multiple second plates 212 having a predetermined structure and stacking the multiple second plates 212 in the first direction. The second plates 212 are, for example, electromagnetic steel sheets. For example, the second plates 212 are formed by punching to have the predetermined structure. The multiple second plates 212 are stacked in the first direction while connected together by swaged portions 223, for example. The multiple second plates 212 may be stacked in the first direction while fixed together by bolting or riveting.

In step S3, a third core portion 23 is formed by forming multiple third plates 213 having a predetermined structure and stacking the multiple third plates 213 in the directions orthogonal to the first direction. The third plates 213 are formed of, for example, amorphous material (e.g., amorphous metal) or nanocrystalline material (e.g., nanocrystalline metal). For example, amorphous material or nanocrystalline material is cut into pieces having a predetermined shape by shear cutting. In this embodiment, the third plates 213 are rectangular.

The yoke portion 231 of the third core portion 23 is formed by stacking in the second direction orthogonal to the first direction. For example, multiple third plates 213 are stacked in the R axis direction by fixing the multiple third plates 213 together by formation with a die, adhesive, or welding. This forms the yoke portion 231. It is possible to select, as the second direction, a direction in which the stacking is easy.

The tooth portion 232 of the third core portion 23 is formed by stacking in the third direction orthogonal to the first direction. For example, multiple third plates 213 are stacked in the W axis direction by fixing the multiple third plates 213 together by formation with a die, adhesive, or welding. It is possible to select, as the third direction, a direction in which the stacking is easy. Of the multiple third plates 213, third plates 213 on both sides in the W axis direction have their tips folded to conform to the shapes of the tip portions 222a of the first core portion 21 and second core portion 22. This forms the tooth portion 232.

The third core portion 23 can be formed by fixing the yoke portion 231 and tooth portion 232 together by, for example, formation with a die, adhesive, or welding.

In the process of forming the third core portion 23, stress is likely to occur in the third core portion 23. Specifically, when the third plates 213 are stacked, stress is likely to occur in the third core portion 23. The stress occurring in the third core portion 23 degrades magnetic properties of the third core portion 23. Thus, in step S3, after forming the third core portion 23, heat treatment (annealing) may be applied to the third core portion 23. This releases stress, eliminating distortion. This results in improvement in magnetic properties of the third core portion 23. Amorphous material and nanocrystalline material, which are used for the third plates 213, significantly deteriorate in magnetic properties due to stress, and thus are highly and advantageously affected by heat treatment.

In step S4, the first core portion 21, second core portion 22, and third core portion 23 are connected together. Specifically, the first core portion 21 and second core portion 22 are fixed with the third core portion 23 sandwiched therebetween. In other words, the third core portion 23 is fixed between the first core portion 21 and the second core portion 22. For example, by formation with a die, adhesive, or welding, the first core portion 21 is fixed to one end of the third core portion 23 in the first direction, and the second core portion 22 is fixed to the other end of the third core portion 23 in the first direction. The first core portion 21, second core portion 22, and third core portion 23 may be fixed by winding the winding 25, instead of adhesive, welding, and formation with a die.

The stator core 20 can be manufactured through the above steps.

The following describes advantages of the stator core 20 of the stator 2 of the electric motor 1 according to the first embodiment.

A stator core formed by stacking multiple plates in a direction (e.g., the circumferential direction or radial direction) orthogonal to the rotation axis direction may have low stiffness. For example, when there are gaps between the multiple plates of the stator core, the gaps reduce the stiffness in the direction orthogonal to the rotation axis direction. Further, the gaps can cause vibration (e.g., vibration in the direction orthogonal to the rotation axis direction) and noise during driving of the electric motor.

The stator core 20 of the electric motor 1 according to the first embodiment includes the first core portion 21 including the multiple first plates 211 stacked in the first direction, the second core portion 22 including the multiple second plates 212 stacked in the first direction, and the third core portion 23 including the multiple third plates 213 stacked in the directions orthogonal to the first direction. The third core portion 23 is sandwiched between the first core portion 21 and the second core portion 22. The first core portion 21 including the multiple first plates 211 stacked in the first direction and the second core portion 22 including the multiple second plates 212 stacked in the first direction can enhance the stiffness in directions orthogonal to the rotation axis direction. This can reduce vibration and noise during driving of the electric motor 1.

For example, when the electric motor 1 is used as a drive source of a compressor, the electric motor 1 is mounted on an inner wall of a hermetic container that is a housing of the compressor. In this case, large stress (stress in directions orthogonal to the rotation axis direction) occurs in the stator core 20. In general, when compressive stress occurs in the stator core, the iron loss increases. With the electric motor 1 according to the first embodiment, it is possible to enhance the stiffness in directions orthogonal to the rotation axis direction, thereby maintaining the shape of the stator core 20 and preventing increase in iron loss. Preventing increase in iron loss can improve the motor efficiency. Further, it is possible to securely fix the electric motor 1 to the hermetic container and reduce vibration and noise of the electric motor 1 in the compressor.

At least one of the first core portion 21 and second core portion 22 of the electric motor 1 may be larger than the third core portion 23 in the radial direction of the stator core 20. Thereby, the at least one of the first core portion 21 and second core portion 22 can be mounted to the inner wall of the hermetic container of the compressor. This reduces compressive stress occurring in the stator core 20 (in particular the third core portion 23) when the electric motor 1 is mounted to the inner wall of the hermetic container of the compressor, and the increase in iron loss can be prevented.

In general, in a stator core, iron loss (energy loss), such as hysteresis loss and eddy current loss, occur. The hysteresis loss is an energy loss produced when a magnetic domain of the stator core has the direction of its magnetic field changed by an alternating magnetic field, and is in theory proportional to the frequency of magnetic flux change occurring in the stator core. The eddy current loss is an energy loss caused by eddy current generated in the stator core (e.g., electromagnetic steel sheets). The eddy current loss is in theory proportional to the square of the frequency of magnetic flux change occurring in the stator core, and is also proportional to the square of the thickness of each of the stacked plates of the stator core. Thus, to prevent increase in iron loss, in particular increase in eddy current loss, it is effective to reduce the stacked plates in thickness.

In the electric motor 1 according to the first embodiment, each of the multiple third plates 213 of the stator core 20 is thinner than each of the multiple first plates 211. This can reduce eddy current loss in the stator core 20 (in particular the third core portion 23). Likewise, each of the multiple third plates 213 is thinner than each of the multiple second plates 212. This can reduce eddy current loss in the stator core 20 (in particular the third core portion 23).

The length of the yoke portion 231 of the third core portion 23 in the first direction is greater than the width of the yoke portion 231 of the third core portion 23 in the second direction. Further, the length of the tooth portion 232 of the third core portion 23 in the first direction is greater than the width of the tooth portion 232 in the third direction. Thereby, it is possible to reduce the number of the third plates 213 for forming the yoke portion 231 of the third core portion 23. Also, it is possible to reduce the number of the third plates 213 for forming the tooth portion 232 of the third core portion 23. Thus, it is possible to reduce the number of steps, such as cutting steps and adhesion steps, for producing the third plates 213, and prolong the lives of tools for forming the third core portion 23.

The multiple third plates 213 are formed of amorphous material or nanocrystalline material. Amorphous material and nanocrystalline material have excellent magnetic properties, and are formed into third plates 213 having a thickness equal to about 3% to 15% of that of an electromagnetic steel sheet. For example, while electromagnetic steel sheets having thicknesses of about 0.2 mm to 0.5 mm are used in stator cores, amorphous material and nanocrystalline material can be formed into plates having a thickness of about 15 μm to 30 μm. For example, the iron loss of an electromagnetic steel sheet commonly used in stator cores is about 1.2 W/kg (at 50 Hz and a magnetic flux density of 1.0 T), the iron loss of amorphous material is about 0.05 W/kg (at 50 Hz and a magnetic flux density of 1.0 T). Thus, since the eddy current loss decreases in proportion to the square of the thickness of a stacked plate, it becomes possible to prevent increase in iron loss even when the electric motor is driven at high frequency.

The first core portion 21 has the insulator fixation portion 224 for fixing the first insulator 24a. Also, the second core portion 22 may have the insulator fixation portion 224 for fixing the first insulator 24a. This makes it possible to fix the first insulator 24a to the stator core 20 without forming the insulator fixation portion 224 in the third core portion 23.

The following describes advantages of the method of manufacturing the stator core 20.

The method of manufacturing the stator core 20 makes it possible to manufacture the stator core 20 having high stiffness in directions orthogonal to the rotation axis direction. Thus, it is possible to manufacture the stator core 20 that can reduce vibration and noise during driving of the electric motor 1.

In general, amorphous materials and nanocrystalline materials have hardnesses (e.g., Vickers hardnesses) that are three to six times that of a typical electromagnetic steel sheet, and thus are poor in processability. For example, while an electromagnetic steel sheet has a Vickers hardness of about 187 GN/m$^3$, an amorphous material has a Vickers hardness of about 900 GN/m$^3$. Further, for amorphous material and nanocrystalline material, since their magnetic properties significantly deteriorate due to compressive stress, fixing methods, such as swaging, that can cause compressive stress are not desirable. Thus, it is desirable to select the fixing method depending on the material of the stator core.

In this embodiment, since the multiple third plates 213 are fixed together by formation with a die, adhesive, or welding, it is possible to securely fix the third core portion 23 while preventing deterioration of magnetic properties of the stator core 20. Further, by fixing each of the first core portion 21 and second core portion 22 with the swaged portions 223, it is possible to enhance the stiffness while preventing deterioration of magnetic properties of the stator core 20 as a whole.

Since amorphous materials and nanocrystalline materials have hardnesses (e.g., Vickers hardnesses) that are three to six times that of a typical electromagnetic steel sheet as described above, they are difficult to process by punching. In this embodiment, by cutting amorphous material or nanocrystalline material into rectangular pieces by shear cutting, it is possible to easily form the third plates 213.

In the step of forming the third core portion 23, applying heat treatment to the third core portion 23 after forming the third core portion 23 releases stress and eliminates distortion. This results in improvement in magnetic properties of the third core portion 23.

Second Embodiment

A drive device 4 according to a second embodiment of the present invention will now be described.

Figure 13:
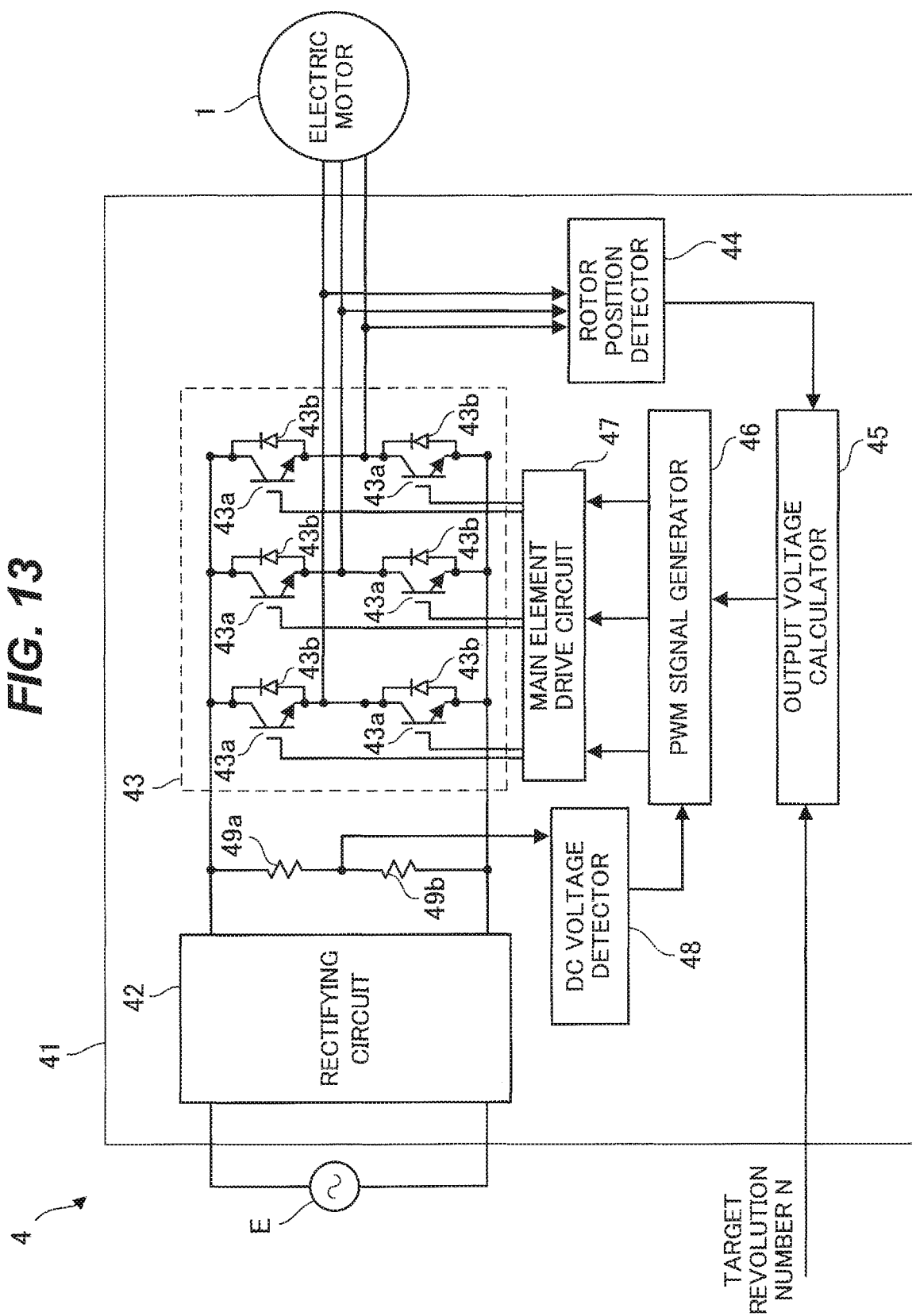
FIG. 13 is a diagram schematically illustrating a configuration of a drive device according to a second embodiment of the present invention.

FIG. 13 is a diagram schematically illustrating a configuration of the drive device 4.

The drive device 4 includes the electric motor 1 according to the first embodiment and a drive circuit 41 that drives the electric motor 1.

The drive circuit 41 is a circuit that drives the electric motor 1 according to the first embodiment. The electric motor 1 according to the first embodiment is subjected to variable speed driving based on pulse width modulation (PWM) control by the drive circuit 41.

Alternating-current (AC) power is supplied to the drive circuit 41 from a commercial AC power source E as an external power source. An AC voltage supplied from the commercial AC power source E is converted into a direct-current (DC) voltage by a rectifying circuit 42. The rectifying circuit 42 includes, for example, a chopper circuit that boosts a voltage applied from the commercial AC power source E, a smoothing capacitor that smoothes a DC voltage, and the like.

The DC voltage converted by the rectifying circuit 42 is converted into AC voltages of variable frequency by an inverter circuit 43 and are applied to the electric motor 1 (specifically, the windings 25). The electric motor 1 is driven by AC power of variable frequency supplied from the inverter circuit 43.

The inverter circuit 43 is, for example, a three-phase bridge inverter circuit. The inverter circuit 43 includes six insulated gate bipolar transistors (IGBTs) 43a as inverter main elements and six SiC Schottky barrier diodes (SiC-SBDs) 43b. In each SiC-SBD 43b, silicon carbide (SiC) is used as a freewheeling diode (FRD). The SiC-SBDs 43b reduce back electromotive forces generated when the IGBTs 43a switch currents from on to off.

A rotor position detector 44 calculates the position of the rotor 3 of the electric motor 1 from output signals of the inverter circuit 43 and outputs the position information of the rotor 3 to an output voltage calculator 45. The rotor position detector 44 may detect the position of the rotor 3 of the electric motor 1 by detecting a terminal voltage of the electric motor 1.

The position information of the rotor 3 detected by the rotor position detector 44 is output to the output voltage calculator 45. The output voltage calculator 45 calculates optimum output voltages of the inverter circuit 43 to be applied to the electric motor 1 on the basis of a target number N of revolutions provided from outside of the drive circuit 41 and the position information of the rotor 3 input from the rotor position detector 44. The output voltage calculator 45 outputs a signal associated with the calculation results (output voltages) to a PWM signal generator 46.

The PWM signal generator 46 outputs PWM signals based on the signal input from the output voltage calculator 45, to a main element drive circuit 47. The main element drive circuit 47 drives each IGBT 43a of the inverter circuit 43. Each IGBT 43a is switched according to the PWM signal from the main element drive circuit 47.

Voltage dividing resistors 49a and 49b are connected in series between the rectifying circuit 42 and the inverter circuit 43. A DC voltage detector 48 detects and holds an electric signal stepped down by the voltage dividing resistors 49a and 49b.

In the drive device 4 according to the second embodiment, an instantaneous value of current supplied to the electric motor 1 (specifically, windings 25) is detected. When the detected instantaneous value is greater than a predetermined value, the output voltage calculator 45 stops the output of the signal to the PWM signal generator 46. This prevents high current from flowing through the electric motor 1, and can prevent demagnetization of the permanent magnets 32 of the rotor 3 caused by a demagnetizing field from the stator 2 and improve reliability of the electric motor 1.

In general, an electric motor (e.g., brushless DC motor) controlled by an inverter is driven with harmonics. Thus, in the iron loss occurring in an electric motor, the ratio of the eddy current loss is greater than that of the hysteresis loss. Thus, by using, in the stator 2 of the electric motor 1, the multiple third plates 213 formed thinner than each of the multiple first plates 211 and multiple second plates 212, it is possible to prevent increase in eddy current loss in the electric motor 1. For example, by using, as the third plates 213, plates formed of amorphous material or nanocrystalline material, it is possible to form third plates 213 with a thin thickness, and effectively prevent increase in eddy current loss.

Third Embodiment

A compressor 5 according to a third embodiment of the present invention will now be described.

Figure 14:
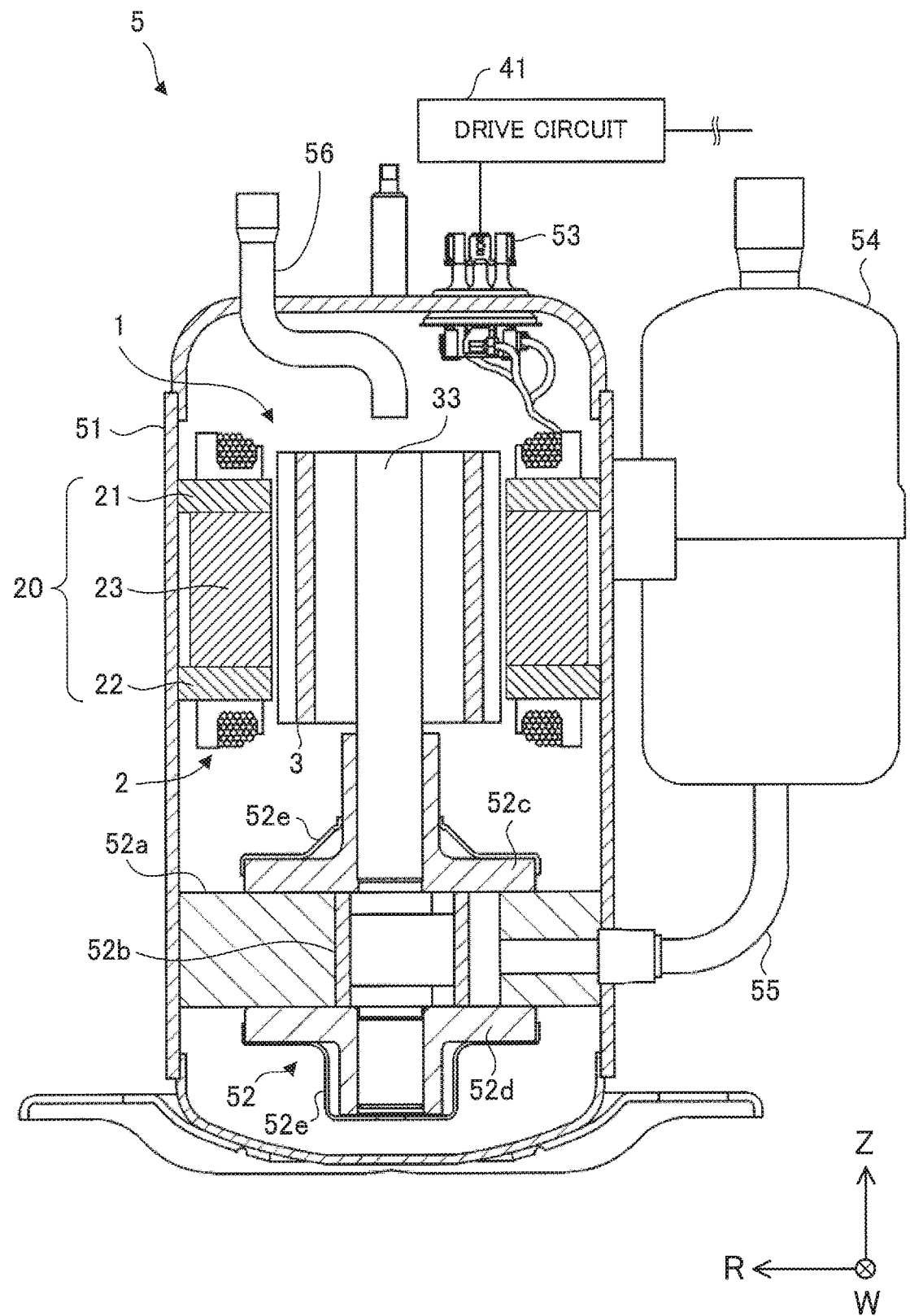
FIG. 14 is a sectional view schematically illustrating a configuration of a compressor according to a third embodiment of the present invention.

FIG. 14 is a sectional view schematically illustrating a configuration of the compressor 5 according to the third embodiment.

The compressor 5 includes the electric motor 1 according to the first embodiment as an electric element, a hermetic container 51 as a housing, a compression mechanism 52 as a compression element, and a drive circuit 41 that drives the electric motor 1. In this embodiment, the compressor 5 is a rotary compressor. However, the compressor 5 is not limited to a rotary compressor.

The hermetic container 51 covers the electric motor 1 and compression mechanism 52. Refrigerant oil for lubricating sliding portions of the compression mechanism 52 is stored in a bottom portion of the hermetic container 51. The drive circuit 41 is the drive circuit described in the second embodiment. Thus, the drive circuit 41 includes the inverter circuit 43.

The compressor 5 further includes a glass terminal 53 fixed to the hermetic container 51, an accumulator 54, an intake pipe 55, and a discharge pipe 56.

In this embodiment, the electric motor 1 is a permanent magnet embedded electric motor, but is not limited to this. The compression mechanism 52 includes a cylinder 52a, a piston 52b, an upper frame (first frame) 52c, a lower frame (second frame) 52d, and multiple mufflers 52e attached to the upper frame 52c and lower frame 52d. The compression mechanism 52 further includes a vane that separates the inside of the cylinder 52a into an intake side and a compression side. The compression mechanism 52 is driven by the electric motor 1.

Power is supplied to the coils (windings 25 described in the first embodiment) of the electric motor 1 (specifically, the stator 2) through the glass terminal 53.

The stator 2 of the electric motor 1 can be directly mounted to the hermetic container 51 by, for example, shrink fitting, welding, or other methods.

At least one of the first core portion 21 and second core portion 22 of the electric motor 1 may be larger than the third core portion 23 in the radial direction (R axis direction in the example illustrated in FIG. 14) of the stator core 20. In this embodiment, both the first core portion 21 and second core portion 22 are larger than the third core portion 23 in the radial direction of the stator core 20. Thus, a space is formed between the third core portion 23 and the hermetic container 51. That is, in this embodiment, the third core portion 23 is not in contact with the hermetic container 51.

It is desirable that heat treatment (annealing) be applied to the third core portion 23 before the stator 2 is mounted to the hermetic container 51. This releases stress, eliminating distortion. This results in improvement in magnetic properties of the third core portion 23. Amorphous material and nanocrystalline material, which are used for the third plates 213, significantly deteriorate in magnetic properties due to stress, and thus are highly and advantageously affected by heat treatment.

The rotor 3 (specifically, the shaft 33) of the electric motor 1 is rotatably held by the upper frame 52c and lower frame 52d via a bearing provided in each of the upper frame 52c and lower frame 52d.

The shaft 33 is inserted in the piston 52b. The shaft 33 is rotatably inserted in the upper frame 52c and lower frame 52d. The upper frame 52c and lower frame 52d occlude ends of the cylinder 52a. The accumulator 54 supplies refrigerant (e.g., refrigerant gas) to the cylinder 52a through the intake pipe 55.

The operation of the compressor 5 will now be described. The refrigerant supplied from the accumulator 54 is taken into the cylinder 52a through the intake pipe 55 fixed to the hermetic container 51. Energizing the inverter rotates the electric motor 1, thereby rotating the piston 52b fitted to the shaft 33 in the cylinder 52a. This compresses the refrigerant in the cylinder 52a.

The refrigerant passes through the mufflers 52e and rises in the hermetic container 51. At this time, the compressed refrigerant is mixed with the refrigerant oil. When the mixture of the refrigerant and refrigerant oil passes through the air holes 36 formed in the rotor core 31, separation of the refrigerant and refrigerant oil is promoted, and the refrigerant oil can be prevented from flowing into the discharge pipe 56. In this manner, the compressed refrigerant is supplied to a high-pressure side of a refrigeration cycle through the discharge pipe 56.

As the refrigerant of the compressor 5, R410A, R407C, R22, or the like may be used. However, the refrigerant of the compressor 5 is not limited to these. For example, as the refrigerant of the compressor 5, low global warming potential (GWP) refrigerants or the like may be used.

Typical examples of the low GWP refrigerants include the following refrigerants:

(1) a halogenated hydrocarbon having a carbon double bond in the composition, for example, HFO-1234yf (CF3CF=CH2), wherein HFO is an abbreviation for Hydro-Fluoro-Olefin, Olefin is an unsaturated hydrocarbon having one double bond, and the GWP of HFO-1234yf is 4;

(2) a hydrocarbon having a carbon double bond in the composition, for example, R1270 (propylene), wherein while the GWP of R1270, which is 3, is lower than that of HFO-1234yf, the flammability of R1270 is higher than that of HFO-1234yf; and (3) a mixture containing at least one of a halogenated hydrocarbon having a carbon double bond in the composition and a hydrocarbon having a carbon double bond in the composition, for example, a mixture of HFO-1234yf and R32, wherein HFO-1234yf, which is a low-pressure refrigerant, has large pressure loss and tends to degrade the performance of the refrigeration cycle (in particular, in an evaporator), so it is desirable to use a mixture thereof with high-pressure refrigerant, such as R32 or R41.

The compressor 5 according to the third embodiment has the following advantages in addition to the advantages described in the first and second embodiments.

In the compressor 5 according to the third embodiment, by using the electric motor 1 as a drive source, it is possible to enhance the stiffness in directions orthogonal to the rotation axis direction (in the example illustrated in FIG. 14, the Z axis direction), and thus to securely fix the electric motor 1 to the hermetic container 51, reducing vibration and noise of the electric motor 1 in the compressor 5.

When at least one of the first core portion 21 and second core portion 22 of the electric motor 1 is larger than the third core portion 23 in the radial direction of the stator core 20, a gap is formed between the third core portion 23 and the hermetic container 51. In this embodiment, the first core portion 21 and second core portion 22 are mounted to the inner wall of the hermetic container 51. Thereby, when compressive stress occurs in the stator core 20, the compressive stress occurs mainly in the first core portion 21 and second core portion 22, and it is possible to reduce occurrence of stress in the third core portion 23. This can prevent increase in iron loss and improve efficiency of the compressor 5. In particular, since amorphous material and nanocrystalline material significantly deteriorate in magnetic properties due to compressive stress, the effect of preventing increase in iron loss is high when amorphous material and nanocrystalline material are used as the third plates 213.

Fourth Embodiment

An air conditioner 6 according to a fourth embodiment of the present invention will be described below.

Figure 15:
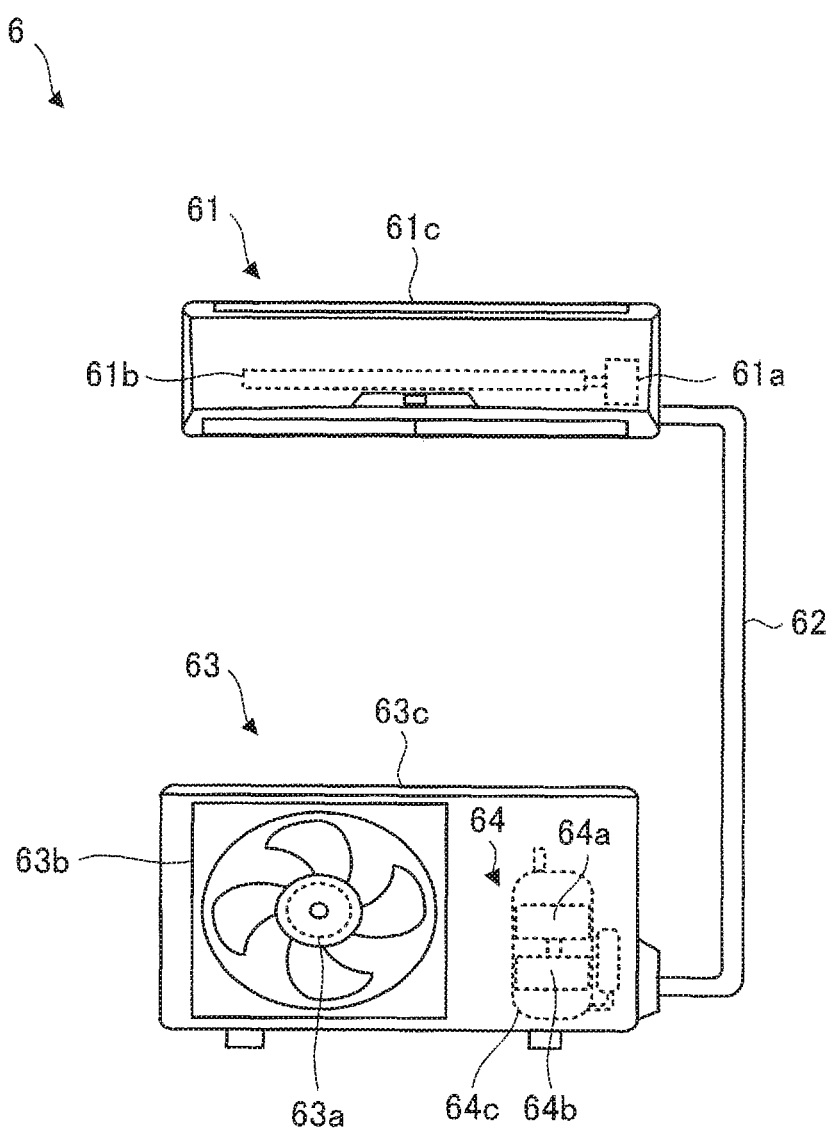
FIG. 15 is a diagram schematically illustrating a configuration of an air conditioner according to a fourth embodiment of the present invention.

FIG. 15 is a diagram schematically illustrating a configuration of the air conditioner 6 according to the fourth embodiment.

The air conditioner 6 (e.g., refrigeration and air conditioning apparatus) according to the fourth embodiment includes an indoor unit 61 as a blower unit (first blower unit), refrigerant piping 62, and an outdoor unit 63 as a blower unit (second blower unit) connected to the indoor unit 61 through the refrigerant piping 62.

The indoor unit 61 includes an electric motor 61a (e.g., the electric motor 1 according to the first embodiment), a blower 61b that blows air by being driven by the electric motor 61a, and a housing 61c that covers the electric motor 61a and blower 61b. The blower 61b includes, for example, blades driven by the electric motor 61a.

The outdoor unit 63 includes an electric motor 63a (e.g., the electric motor 1 according to the first embodiment), a blower 63b, a compressor 64 (e.g., the compressor 5 according to the third embodiment), and a heat exchanger (not illustrated). The blower 63b blows air by being driven by the electric motor 63a. The blower 63b includes, for example, blades driven by the electric motor 63a. The compressor 64 includes an electric motor 64a (e.g., the electric motor 1 according to the first embodiment), a compression mechanism (e.g., refrigerant circuit) 64b driven by the electric motor 64a, and a hermetic container (compression container) 64c as a housing that covers the electric motor 64a and compression mechanism 64b.

In the air conditioner 6 according to the fourth embodiment, at least one of the indoor unit 61 and outdoor unit 63 includes the electric motor 1 described in the first embodiment. Specifically, the electric motor 1 described in the first embodiment is used as at least one of the electric motors 61a and 63a as drive sources of the blowers.

The compressor 5 according to the third embodiment may be used as the compressor 64. In this case, the electric motor 1 described in the first embodiment is used as the electric motor 64a of the compressor 64.

The air conditioner 6 can perform operations, such as a cooling operation in which cool air is blown from the indoor unit 61, or a heating operation in which warm air is blown from the indoor unit 61. In the indoor unit 61, the electric motor 61a is a drive source for driving the blower 61b. The blower 61b can blow conditioned air.

In the air conditioner 6 according to the fourth embodiment, the electric motor 1 described in the first embodiment is used as the at least one of the electric motors 61a and 63a, and thus it is possible to obtain the same advantages as those described in the first embodiment.

Further, by using the compressor 5 according to the third embodiment as the compressor 64, it is possible to obtain the same advantages as those described in the third embodiment and improve the operational efficiency of the air conditioner 6.

The features of the above-described embodiments can be combined as appropriate.

Although preferred embodiments have been specifically described above, it is obvious that those skilled in the art can employ various modifications on the basis of the basic technical concepts and teachings of the present invention.

The invention claimed is:

1. A stator core comprising:
a first core portion including a plurality of first plates stacked in a first direction;
a second core portion including a plurality of second plates stacked in the first direction; and
a third core portion including a plurality of third plates stacked in at least one direction orthogonal to the first direction, the third core portion being sandwiched between the first core portion and the second core portion,
wherein the third core portion has a yoke portion formed of a subset of the plurality of third plates stacked in a second direction orthogonal to the first direction.

2. The stator core of claim 1, wherein each of the plurality of third plates is thinner than each of the plurality of first plates.

3. The stator core of claim 1, wherein each of the plurality of third plates is thinner than each of the plurality of second plates.

4. The stator core of claim 1, wherein the plurality of first plates and the plurality of second plates are formed of the same material.

5. The stator core of claim 1, wherein a length of the yoke portion in the first direction is longer than a width of the yoke portion in the second direction.

6. The stator core of claim 1, wherein the third core portion has a tooth portion formed of another subset of the plurality of third plates stacked in a third direction orthogonal to the first direction.

7. The stator core of claim 6, wherein a length of the tooth portion in the first direction is longer than a width of the tooth portion in the third direction.

8. The stator core of claim 1, wherein at least one of the first core portion and the second core portion is longer than the third core portion in a radial direction.

9. The stator core of claim 1, wherein at least one of the first core portion and the second core portion has a fixation portion that fixes an insulator.

10. The stator core of claim 1, wherein the plurality of third plates are formed of amorphous material or nanocrystalline material.

11. The stator core of claim 1, wherein at least one of the plurality of first plates and the plurality of second plates is a plurality of electromagnetic steel sheets.

12. A stator comprising:
a stator core;
an insulator combined with the stator core; and
a winding wound around the stator core via the insulator,
wherein the stator core comprises:
a first core portion including a plurality of first plates stacked in a first direction;
a second core portion including a plurality of second plates stacked in the first direction; and
a third core portion including a plurality of third plates stacked in at least one direction orthogonal to the first direction, the third core portion being sandwiched between the first core portion and the second core portion, and
wherein the third core portion has a yoke portion formed of a subset of the plurality of third plates stacked in a second direction orthogonal to the first direction.

13. An electric motor comprising:
a rotor; and
the stator of claim 12.

14. A drive device comprising:
the electric motor of claim 13; and
a drive circuit to drive the electric motor.

15. A compressor comprising:
the electric motor of claim 13;
a compression mechanism driven by the electric motor;
a drive circuit to drive the electric motor; and a housing that covers the electric motor and the compression mechanism.

16. The compressor of claim 15, wherein at least one of the first core portion and the second core portion is larger than the third core portion in a radial direction.

17. An air conditioner comprising:
an indoor unit; and
an outdoor unit connected to the indoor unit,
wherein at least one of the indoor unit and the outdoor unit includes the electric motor of claim 13.

18. A method of manufacturing a stator core, the method comprising:
forming a first core portion by stacking a plurality of first plates in a first direction;
forming a second core portion by stacking a plurality of second plates in the first direction;
forming a third core portion by stacking a plurality of third plates in at least one direction orthogonal to the first direction; and
a step of fixing the first core portion and the second core portion with the third core portion sandwiched therebetween,
wherein the third core portion has a yoke portion formed of a subset of the plurality of third plates stacked in a second direction orthogonal to the first direction.

19. The method of manufacturing a stator core of claim 18, wherein the forming the third core portion includes cutting amorphous material or nanocrystalline material into a predetermined shape by shear cutting to form the plurality of third plates.

20. The method of manufacturing a stator core of claim 18, wherein the forming the third core portion includes fixing the plurality of third plates by formation with a die, adhesive, or welding.

21. The method of manufacturing a stator core of claim 18, wherein the forming the third core portion includes applying heat treatment to the third core portion.

* * * * *